United States Patent [19]

Yanagisawa et al.

[11] Patent Number: 4,719,328

[45] Date of Patent: Jan. 12, 1988

[54] TOUCH-UP WELDING APPARATUS FOR MOTORCAR BODY

[75] Inventors: Takashi Yanagisawa, Hidakamachi; Genzo Fuse, Higashimatsuyama, both of Japan

[73] Assignee: Honda Giken Kogyo Kabushiki Kasha, Toyko, Japan

[21] Appl. No.: 887,472

[22] Filed: Jul. 21, 1986

[30] Foreign Application Priority Data

Jul. 22, 1985 [JP] Japan .................................. 60-160372
Jul. 23, 1985 [JP] Japan .................................. 60-161153

[51] Int. Cl.$^4$ ..................... B23K 11/00; B23K 37/02
[52] U.S. Cl. ......................................... 219/79; 219/80; 228/45; 901/42
[58] Field of Search ..................... 219/79, 80, 137 R; 228/4.1, 45, 47; 901/41, 42

[56] References Cited

U.S. PATENT DOCUMENTS

| 3,665,148 | 5/1972 | Yasenchak et al. | 219/80 X |
| 4,256,947 | 3/1981 | De Candia | 219/79 |
| 4,310,958 | 1/1982 | Balaud et al. | 901/42 X |

FOREIGN PATENT DOCUMENTS

| 154379 | 9/1982 | Japan | 219/79 |
| 2504431 | 10/1982 | Japan | 219/86.1 |
| 174278 | 10/1984 | Japan | 219/137 R |

Primary Examiner—E. A. Goldberg
Assistant Examiner—C. M. Sigda
Attorney, Agent, or Firm—Armstrong, Nikaido, Marmelstein & Kubovcik

[57] ABSTRACT

A touch-up welding apparatus for welding such portions of a motorcar body which remain unwelded after the body has passed along a main welding portion of an assembly line. Plural welding gun magazines holding differing welding guns are disposed along side of a welding station into which the motorcar body is positioned. A framework surrounds the welding station and supports the main body of a welding robot which is movable laterally and longitudinally of the station. A turnable, swingable wrist portion is provided on a lower end of an upwardly and downwardly movable robot arm attached to the robot main body. The differing welding guns may be selectively attached to the wrist portion and moved about the motorcar body as desired to weld the remaining unwelded portions thereof.

4 Claims, 7 Drawing Figures

TOUCH-UP WELDING APPARATUS FOR MOTORCAR BODY

BACKGROUND OF THE INVENTION

This invention relates to a touch-up welding apparatus for a motorcar body assembly line for welding such portions, among many portions to be welded of a motorcar body, that remain unwelded after the body has passed along the main welding line.

Previously, it has been usual during the assembling of a motorcar body, that the side panels are temporarily or spot welded to a floor panel and a roof panel for a motorcar body. The resultant assembly is stepwise-conveyed along a main welding line, and during this stepwise-conveying, the assembly is additionally welded together by welding robots provided on side portions of each station on the line. It has been usual with this welding operation that there remain, as a result of a problem of the interference of the robots with the motorcar body, some portions which are unwelded, though a few, at such complicated or intricate portions as of the trunk, the roof rail, the fender or the like. These unwelded remainder portions are touch-up welded by a manual operation at the subsequent step.

To weld such unwelded remainder portions manually, as mentioned above, compels an operator to work in an unnatural, uncomfortable posture. Lower productivity results. Therefore, automatization of the touch-up welding is desired.

This invention has for its object to provide a touch-up welding apparatus meeting this desire.

According to this invention, for achieving the foregoing object, the invention includes a welding station into which a motorcar body having remaining unwelded portions thereof after passing through a main welding portion of the assembly line is positioned. Plural welding gun magazines for supporting respective differing welding guns are disposed adjacent a setting position for the motorcar body in the welding station. A framework surrounds the welding station and is provided with a welding robot mounted thereon. A robot main body of the welding robot is provided on the framework is movable laterally and longitudinally of the welding station. A wrist portion provided on a lower end of an upwardly and downwardly movable robot arm extending downwards from the robot main body is arranged so that each one of the respective welding guns on the respective gun magazines may be selectively attached thereto detachably for being replaceable one with another. In this manner, by replacing these welding guns one with another, such portions of the motorcar body that remained unwelded after passing through the main welding portion of the assembly line may be welded thereby.

Next, the operation of the foregoing apparatus will be explained as follows:

By moving the robot main body along the framework in the front and rear directions and in the right and left directions, and additionally, moving the robot arm upwards and downwards, the wrist portion on the lower end of the arm can be moved in a wide range without any interference thereof with the motorcar body. The remaining unwelded portions existing here and there extensively on the motorcar body can be welded, by replacing the welding guns between the wrist portion and the plural magazines.

BRIEF EXPLANATION OF THE DRAWINGS

The above and other objects and the attendant advantages of the present invention will become readily apparent by reference to the following detailed description when considered in conjunction with the accompanying drawings wherein.

DETAILED DESCRIPTION OF THE PREFERRED EMBODIMENT

Figure 1:
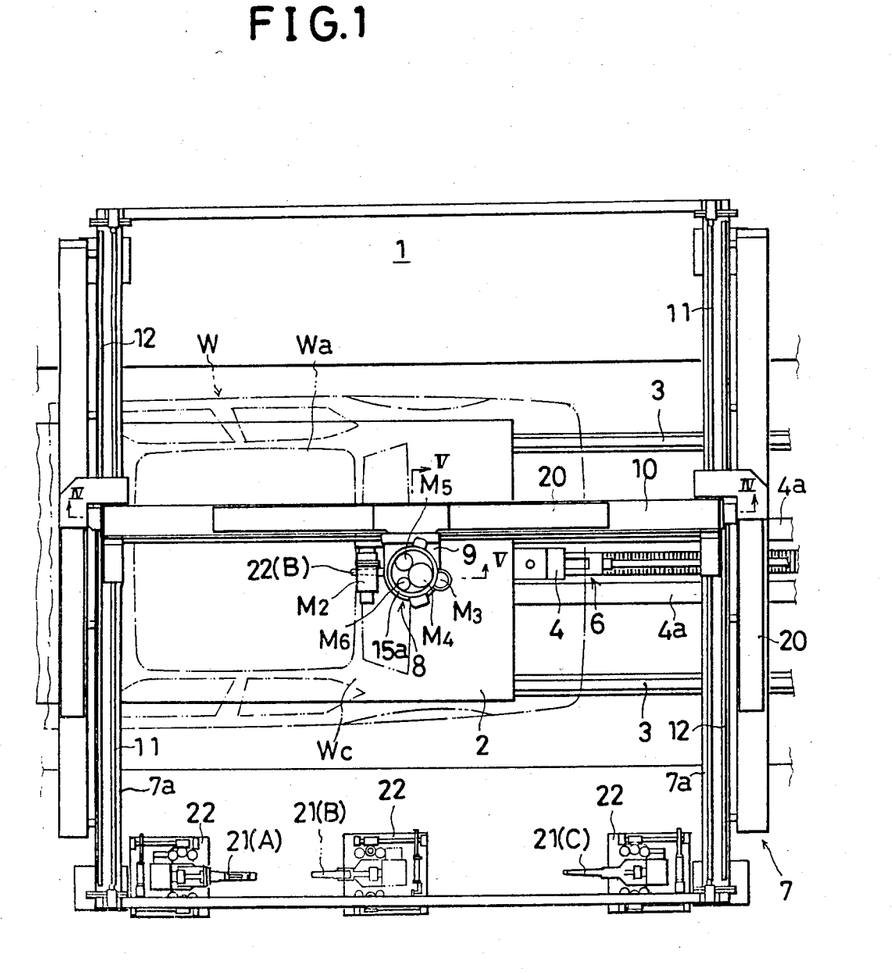
FIG. 1 is a top plan view of one embodiment of this invention.
Figure 2:
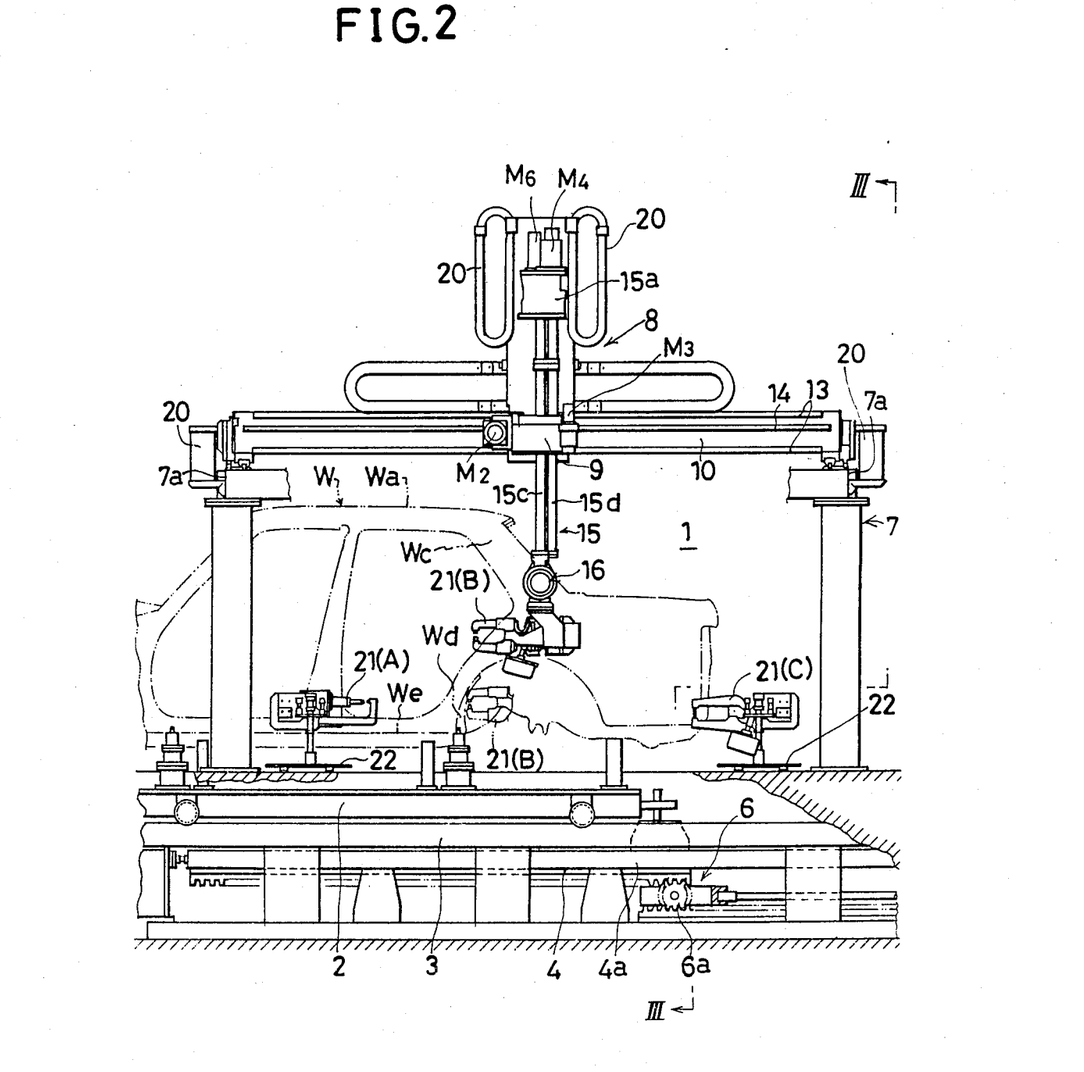
FIG. 2 is a side view thereof.
Figure 3:
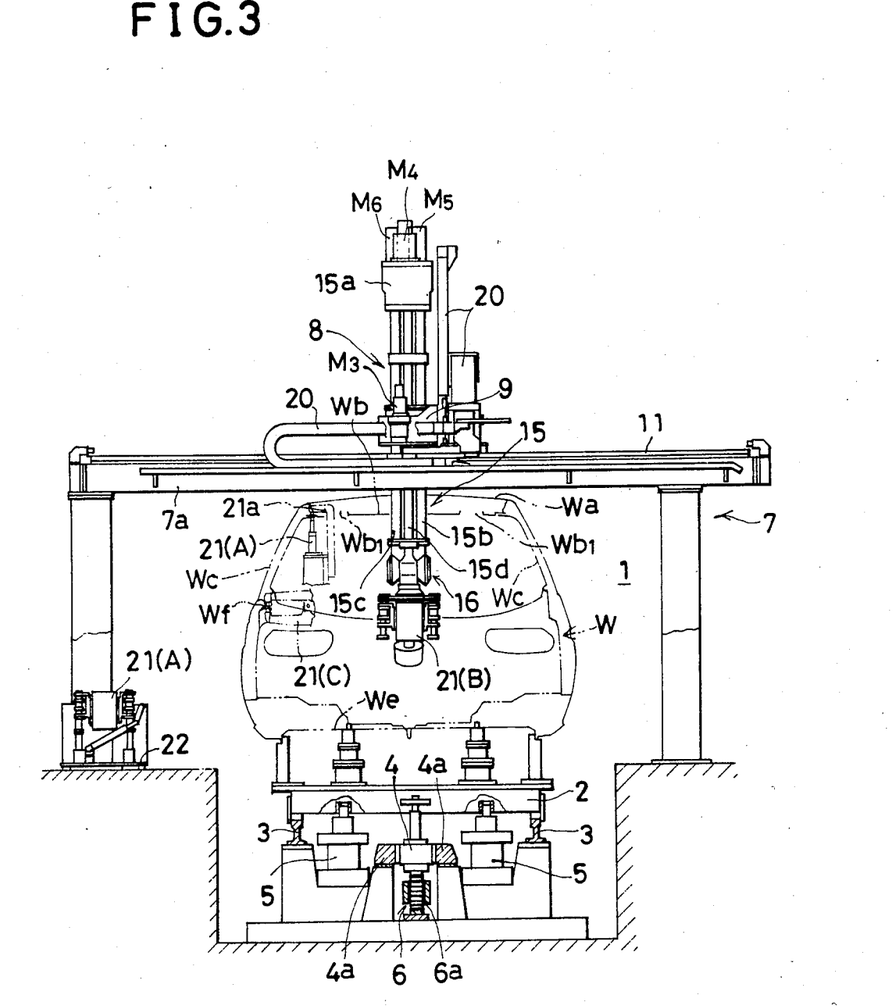
FIG. 3 is a sectional front view taken along the line III—III in FIG. 2.

One embodying example of this invention will be explained with reference to the accompanying drawings:

Referring to FIGS. 1–3, a motorcar body W previously at least partially welded together is conveyed into a welding station 1 from a set station (not illustrated) located on a rear side, that is, on the right side in FIGS. 1 and 2, with the motorcar body W resting on a carrier 2. In the illustrated example, the carrier 2 is supported on a pair of left and right rails 3, 3, and is arranged to be reciprocated between the welding station 1 and the set station by action of a transfer bar 4 supported on a pair of guide rails 4a, 4a provided between the two rails 3, 3. The welding station 1 is provided with plural positioning cylinders 5 so that the carrier 2, and accordingly, the motorcar body W resting thereon may be set in position at a predetermined conveyed or introduced position thereof.

The transfer bar 4 is arranged to be driven by a rack and pinion type double speed mechanism 6 using a pinion 6a movable to advance and retreat by a cylinder (not illustrated).

A framework 7 surrounds the welding station 1. A robot 8 is mounted on the framework 7. A robot main body 9 of the robot 8 is provided on the framework 7 and is movable in the front and rear directions and the right and left directions thereon.

More in detail, the framework 7 is provided with a self-propelled frame 10 which is movable in the left and right directions with respect to the conveying line and extends between front and rear beams 7a, 7a of an upper portion of the framework 7. The robot main body 9 is supported on the self-propelled frame 10 and is movable forwards and rearwards with respect to the conveying line.

Figure 4:
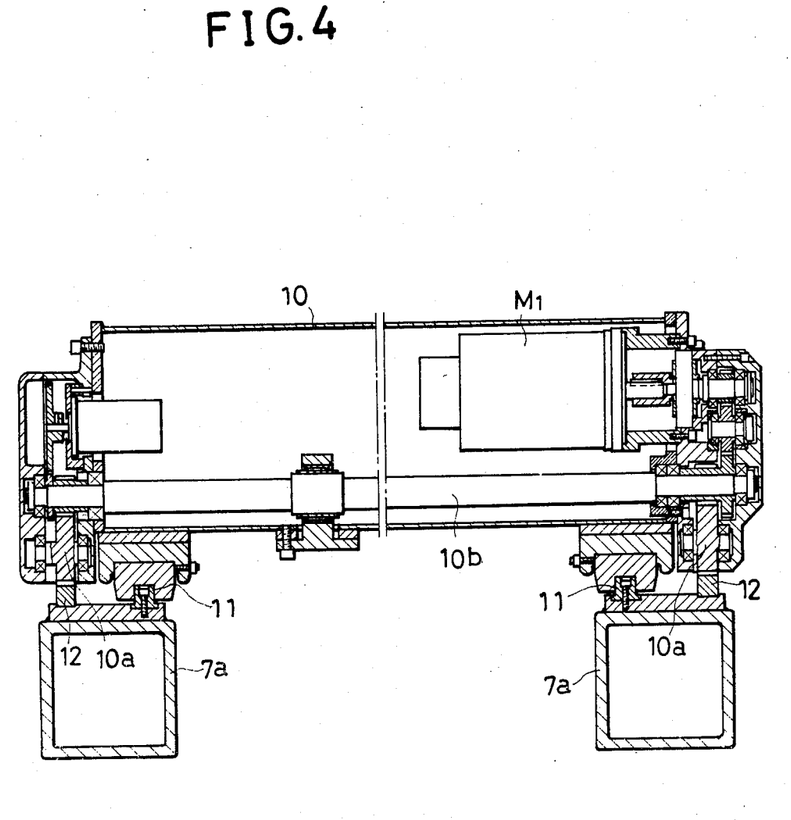
FIG. 4 is an enlarged sectional view of a self-propelled frame portion thereof taken along the line IV—IV in FIG. 1.

As shown clearly in FIG. 4, the self-propelled frame 10 is supported on a pair of guide rails 11, each fixedly provided on an upper surface of one of the beams 7a. The frame 10 is movable to the left and right. Pinions 10a, 10a are provided on the end portions of the frame 10 and mesh with racks 12, 12, fixed on the upper surfaces of the beams 7a, 7a, (FIG. 4) so that by synchronously driving the two pinions 10a, 10a through a synchronizing shaft 10b by a first driving motor $M_1$ mounted on the self-propelled frame 10, the self-propelled frame 10 may be moved to the left and the right of the welding station 1.

Figure 5:
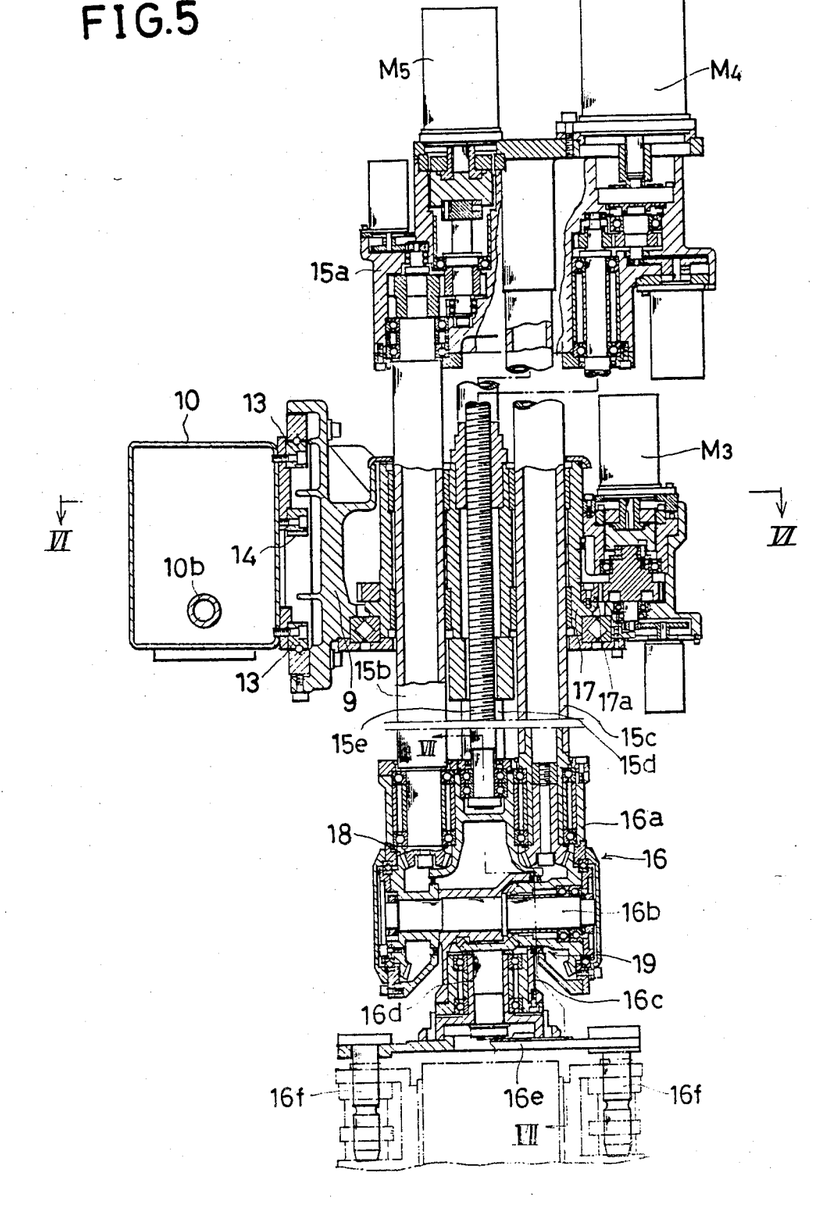
FIG. 5 is an enlarged sectional view of a robot portion thereof taken along the line V—V in FIG. 1.
Figure 6:
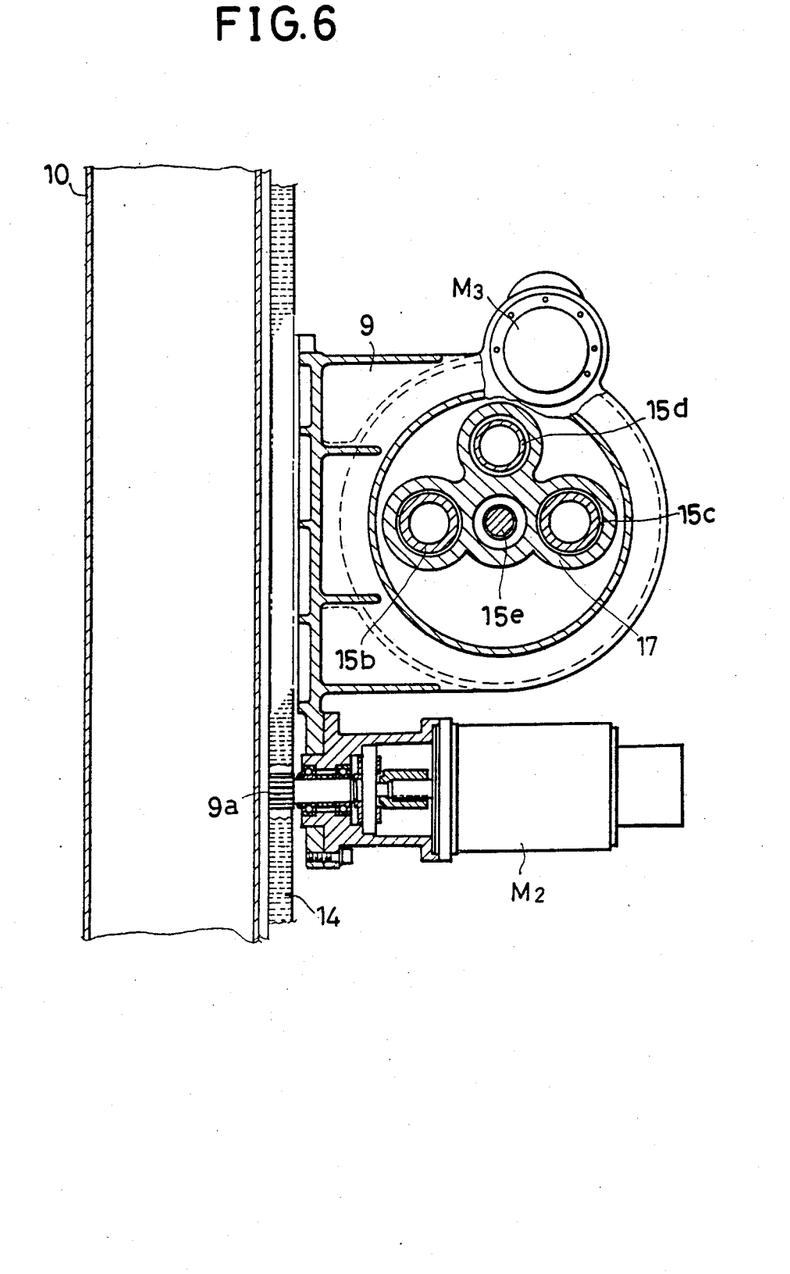
FIG. 6 is a sectional view taken along the line VI—VI in FIG. 5.

Additionally, as shown clearly in FIGS. 5 and 6, the robot main body 9 is supported on a pair of upper and lower guide rails 13, 13 fixedly provided on the self-propelled frame 10 as to be movable forwards and rearwards. The main body 9 is also provided on either one side of the forward and rearward sides thereof with a pinion 9a meshed with a rack 14 fixed to the self-propelled frame 10 so that by driving the pinion 9a by a second driving motor $M_2$ mounted on the robot main body 9, the robot main body 9 may be moved forwards and rearwards of the welding station 1.

A robot arm 15 extends downwardly and is supported on the robot main body 9 to be movable upwards and downwards. A wrist portion 16 is provided on a lower end portion thereof. A welding gun 21 may be detachably attached to the wrist portion 16 as described hereinafter.

Figure 7:
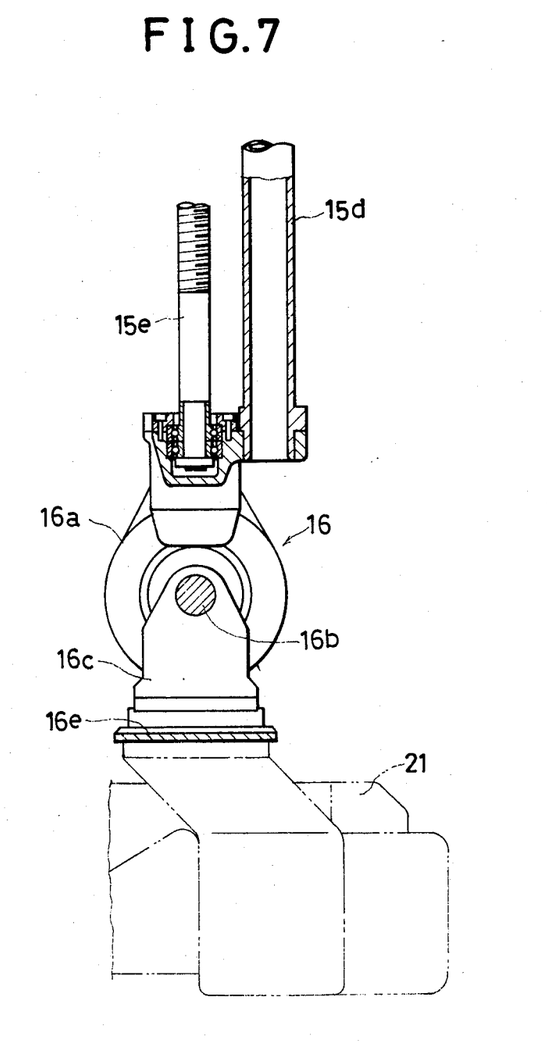
FIG. 7 is a sectional view taken along the line VII—VII in FIG. 5.

More in detail, in the illustrated example, the robot main body 9 is provided with a turning member 17 which is turnable about a vertical axis through a gear 17a by a third driving motor $M_3$ mounted on the robot main body 9. The robot arm 15 is inserted through and supported on the turning member 17 so as to be movable upwards and downwards. The wrist portion 16 has two-axis degree of freedom comprising a swing movement about a horizontal axis and a turning movement about its own axis crossing, at right angles, the foregoing horizontal axis. Namely, as shown clearly in FIGS. 5 and 7, the wrist portion 16 is constructed comprising a swingable casing 16c which is swingable about a horizontal shaft 16b on a wrist main body 16a connected to a lower end of the robot arm 15, and a gun attaching plate 16e which is attached to the casing 16c and turnable about a shaft 16d crossing, at right angles, the foregoing horizontal shaft 16b so that the welding gun 21 held by the attaching plate 16e may be given its movements in the front, rear, left and right directions by the foregoing movements of the self-propelled frame 10 and the robot main body 9, its turning movement by turning of the turning member 17, its movement in the upper and lower directions by the upwards and downward movements of the robot arm 15, its swing movement in the upper and lower directions by a swing movement of the swingable casing 16c, and its turning movement about its own axis by turning of the attaching plate 16e. Thus, a desired welding operation of the welding gun 21 can be performed at any desired position at the welding station 1 from any desired direction.

In the illustrated example, the robot arm 15 is composed of a base frame 15a at its upper end and three pipe-shaped rods 15b, 15c, 15d extending downwards therefrom. The three rods 15b, 15c, 15d are inserted through the turning member 17 so as to be movable upwards and downwards. A screw rod 15e connected to a fourth driving motor $M_4$ mounted on the base frame 15a is inserted through the turning member 17 in upper and lower directions and is in threaded engagement therewith so that the robot arm 15 may be moved upwards and downwards by the screw rod 15e being rotated by the driving motor $M_4$.

Additionally, a fifth driving motor $M_5$ is provided for swinging of the wrist portion 16, that is, for turning the swingable casing 16c. A sixth driving motor $M_6$ is provided for turning the casing 16c about its own axis of the wrist portion 16, that is, for rotating the attaching plate 16e. The motors $M_5$ and $M_6$ are mounted on the base frame 15a. Predetermined two of the rods, among the foregoing three rods 15b, 15c, 15d, that is for example, the first rod 15b and the second rod 15c are formed to be power transmission shafts connected, respectively, to the driving motors $M_5$, $M_6$, so that the swingable casing 16c may be swung by the fifth driving motor $M_5$ through the first rod 15d and a bevel gear mechanism 18, and the attaching plate 16e may be turned by the sixth driving motor $M_6$ through the second rod 15c and a bevel gear mechanism 19.

Thus, owing to the fact that the two rods 15b, 15c constituting a constructional body of the robot arm 15 are used also for the transmission shafts, the arm 15 can be decreased in weight and thereby the operation speed-up can be achieved.

The remainder third rod 15d is formed into a conduit pipe for inserting therethrough operating means such as wiring and piping members (not illustrated) for electric supply, air supply or the like to the welding gun held by the attaching plate 16e, so that management of those members can be improved. In addition, the three rods 15b, 15c, 15d are so disposed that the shape interconnecting between the axial centerlines thereof may be a triangle as shown in FIG. 6, so that the robot arm 15 can be stronger in bending rigidity and twisting rigidity. In this manner, any bending or twisting of the arm 15 caused by an inertia force of the welding gun at the time of movement thereof forwards, rearwards, rightwards, and leftwards, or by an inertia movement thereof at the time of turning thereof about its axis may be restrained.

Cable guides 20 are provided for each of the self-propelled frame 10, the robot main body 9 and the robot arm 15 and are arranged to be movable with each movement of the self-propelled frame 10, the robot main body 9 and the robot arm 15.

Now, at the foregoing welding station 1, three gun magazines 22 for supporting respective welding guns 21 of different types are disposed in front and rear relationship and on one side of a set position at which the motorcar body W introduced into the welding station 1 is set in position. A C-shaped welding gun 21 denoted by A is supported on the front gun magazine 22, a comparatively small-sized X-shaped welding gun 21 denoted by B is supported on the middle gun magazine 22, and a comparatively large-sized X-shaped welding gun 21 denoted by C is supported on the rear gun magazine 22. Any desired one of these welding guns 21 on the respective gun magazines 22 may be attached to the wrist portion 16 of the robot 8 detachably for being replaced one with another.

Each welding gun 21 is provided with a proper locking means engageable with connecting pins 16f projecting vertically from the attaching plate 16e of the wrist portion 16. Each magazine 22 is provided with a proper unlocking means for handling the locking means so that there may be carried out a simple transfer of the welding gun 21 between each magazine 22 and the wrist portion 16.

The C-shaped welding gun 21 (A) is adapted to be used, for instance, for welding a roof rail Wb on a lower surface of a rear edge portion of a roof Wa of the motorcar body W to a rear pillar Wc. Namely, in this case, the gun 21 (A) is received on the wrist portion 16, and is moved to a predetermined position by operation of the robot 8, and as shown in FIG. 3, a stationary arm 21a of the gun 21 (A) is inserted through an opening Wb1 made in the roof rail Wb and welding between the roof rail Wb and the rear pillar Wc is carried out.

Instead thereof, as shown in FIG. 2, the small-sized X-shaped welding gun 21 (B) is received on the wrist portion 16 for welding unwelded remainder portions of an inner panel of a fender Wd and of a floor We. Further, instead thereof, the large-sized X-shaped welding gun 21 (C) is received on the wrist portion 16 for welding unwelded remainder portions of an upper edge Wf of an inside portion of a trunk.

Thus, according to this invention, by the movements of the robot main body on the framework in front and rear directions and in the left and right directions and the movements of the robot arm in the upper and lower directions, the wrist portion on the lower end of the robt arm can be moved to any desired position in the space of the welding station surrounded by the framework without any interference thereof with the motorcar body, and, by replacing the welding guns one with another between the wrist portion and the respective gun magazines disposed on the side of the set position for the motorcar body introduced into the welding station, respective portions remaining unwelded existing here and there extensively on the motorcar body can be automatically welded by the respective predetermined welding guns, and thus, the productivity can be improved.

It is readily apparent that the above-described touch-up welding apparatus meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A touch-up welding apparatus for welding such portions of a motorcar body which remain unwelded after the body has passed along a main welding portion of a motorcar body assembly line comprising:
    a welding station including means for moving a motorcar body into the station after passing along a main welding portion of an assembly line and means for setting the motorcar body at a predetermined setting position;
    plural welding gun magazines for supporting respective differing welding guns disposed adjacent said setting position;
    a framework surrounding said welding station and supporting horizontally spaced guide rails above said setting position and a frame member mounted for movement along said guide rails above said motorcar body in one of a lateral or longitudinal direction relative to said motorcar body; and
    a welding robot including a robot main body mounted to said frame member for movement along said frame member in the other of said lateral or longitudinal direction relative to said motorcar body, means for moving said frame member in said one direction, means for moving said robot main body in said other direction, a robot arm extending downwardly from said robot main body, means for rotating said robot arm about a vertical axis, means for moving said arm upwardly and downwardly, a wrist portion provided on a lower end of said robot arm, and means for rotating said wrist portion about a horizontal axis for swinging said wrist portion up and down, and
    means for rotating said wrist portion about a vertical axis for turning movement of said wrist portion independently of said robot arm, said welding guns being selectively attachable to said wrist portion,
    whereby selective replacement of the welding guns on the wrist portion of the welding robot arm from the plural welding gun magazines and movement of the robot main body laterally and longitudinally relative to the motorcar body and the robot arm upwardly and downwardly permits access to all areas of the motorcar body and enables welding of the remaining unwelded portions of the motorcar body.

2. A touch-up welding apparatus as claimed in claim 1, wherein said robot main body includes a turning member turntable about a vertical axis, and said robot arm comprises a base frame mounted above said turning member and three rods extending downwardly of said base frame through said turning member, said means for rotating said wrist portion comprises a first driving motor and a second driving motor mounted on said base frame and two of said three rods interconnected between said first and second driving motors and said wrist portion as power transmission shafts; and the remaining single rod is constructed as a conduit pipe for passing necessary operating means for a welding gun attached to the wrist portion.

3. A touch-up welding apparatus as claimed in claim 2, wherein said three rods are positioned relative to one another such that their axial centerlines define a triangle in an intersecting horizontal plane.

4. A touch-up welding apparatus as claimed in claim 2, wherein said means for moving said arm upwardly and downwardly comprises a third driving motor mounted on said base frame and a screw rod connected to said third driving motor extending in a vertical direction longitudinally of said arm and being inserted through and in threaded engagement with said turning member.

* * * * *